United States Patent [19]

Tom

[11] Patent Number: 4,603,148

[45] Date of Patent: Jul. 29, 1986

[54] MACRORETICULATE POLYMER SCAVENGERS FOR THE REMOVAL OF IMPURITIES FROM INERT FLUIDS

[75] Inventor: Glenn M. Tom, Wilmington, Del.

[73] Assignee: Hercules Incorporated, Wilmington, Del.

[21] Appl. No.: 655,856

[22] Filed: Sep. 28, 1984

Related U.S. Application Data

[63] Continuation-in-part of Ser. No. 493,875, May 12, 1983, abandoned.

[51] Int. Cl.$^4$ .............................................. C08D 5/20
[52] U.S. Cl. ........................................ 521/31; 521/29; 521/52; 521/53; 521/28; 525/366; 525/332.2
[58] Field of Search ............... 525/366, 332.2; 521/29, 521/30, 28, 52, 31, 53

[56] References Cited

U.S. PATENT DOCUMENTS

| | | | |
|---|---|---|---|
| 3,079,428 | 2/1963 | Baer et al. | 260/486 |
| 3,133,048 | 5/1964 | Moore et al. | 260/88.3 |
| 3,162,624 | 12/1964 | Moore et al. | 260/88.1 |
| 3,234,193 | 2/1966 | Leavitt | 525/366 |
| 3,316,223 | 4/1967 | Baer et al. | 260/80.5 |
| 3,408,339 | 10/1968 | Baer et al. | 260/80.73 |
| 3,492,369 | 6/1970 | Naylor | 525/366 |
| 4,224,415 | 9/1980 | Meitzner et al. | 521/38 |
| 4,256,840 | 3/1981 | Meitzner et al. | 521/33 |
| 4,297,220 | 10/1981 | Meitzer et al. | 210/690 |
| 4,463,135 | 7/1984 | Maly | 525/123 |
| 4,477,597 | 10/1984 | Lee et al. | 521/28 |
| 4,563,371 | 1/1986 | Sirinyon et al. | 521/31 |

OTHER PUBLICATIONS

Bates et al., Macromolecules, 14 (1981), pp. 881-883,
Chemical and Engineering News, Nov. 15, 1982, p. 15.
Coates et al., Organometallic Compounds, vol. 1, Methuen and Co., Ltd., London, 1967, p. 34.
Taylor, Macromolecules, 14 (1981), pp. 1134-1135.

Primary Examiner—Joseph L. Schofer
Assistant Examiner—Peter F. Kulkosky
Attorney, Agent, or Firm—Joanne W. Patterson; Marion C. Staves

[57] ABSTRACT

Lewis acid and oxidant impurities are removed from inert fluids by contacting with a high capacity macroreticulate polymer comprising a macroreticulate polymer backbone having a plurality of pendant functional groups or mixtures of functional groups having the general formula:

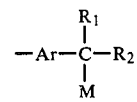

where Ar is an aromatic hydrocarbon radical containing from one to three rings; $R_1$ and $R_2$ are the same or different and are selected from the group consisting of hydrogen, alkyl hydrocarbon radicals, methylene-bridged benzophenone radicals, salts of methylene-bridged benzophenone, methylene-bridged fluorenone radicals and salts of methylene-bridged fluorenone; and M is selected from the group consisting of lithium, potassium, sodium, alkyl magnesium, and alkyl zinc.

12 Claims, No Drawings

MACRORETICULATE POLYMER SCAVENGERS FOR THE REMOVAL OF IMPURITIES FROM INERT FLUIDS

This application is a continuation-in-part of copending U.S. application Ser. No. 493,875 filed May 12, 1983, now abandoned.

BACKGROUND OF THE INVENTION

This invention relates to novel scavengers and the use thereof. In particular, this invention relates to high capacity macroreticulate polymer scavengers comprising a macroreticulate polymer backbone having a plurality of pendant metallated functionalities and their use to remove oxidants and Lewis acids from inert fluids including both liquids and gases.

In numerous products and processes the purity of fluids is of critical importance. Often, the presence of even small amounts of Lewis acid or oxidant impurities will dramatically reduce the utility of a fluid. Consequently, there is a continuing need for new and better ways of purifying such fluids.

Among the known methods for purification of inert fluids is the use of scavengers. With this method, a fluid is passed over a scavenger, as for example passed through a bed or column containing the scavenger, and the scavenger reacts with and removes impurities without affecting the fluid itself.

Among the properties desired in a good scavenger are removal of a wide variety of impurities, a low level of impurities left in the fluid after treatment with the scavenger, and a high capacity for reaction with and removal of impurities. In other words, a small amount of scavenger should effectively reduce the amounts of a wide variety of impurities to a low level. Furthermore, it is desired that a scavenger be effective not only when swollen by the liquid to be purified, but that it be effective with liquids that cannot swell the scavenger, and gases. In some embodiments it is also desired that the scavenger have uniform loading, i.e., some of its reactive sites should not be more reactive than others. Where a scavenger does not have uniform loading it does not behave consistently throughout its lifetime, thereby making it difficult to predict how the scavenger will perform at any particular time. It is also desired that the scavenger have good thermal stability. Finally, it is desired that the scavenger change color upon reaction with impurities, e.g., change from an intensely colored to a colorless state as it becomes exhausted, thereby indicating when the scavenger needs to be replaced.

U.S. Pat. Nos. 3,079,428 and 3,316,223 teach purifying organic liquids of acidic impurities by contacting the liquids with an insoluble polymeric anionic scavenger material.

Chemical and Engineering News, Nov. 15, 1982, p. 15 discloses that functionalized poly(styrene-divinylbenzene), including lithiated poly(styrene-divinylbenzene), may be used as a catalyst support. Taylor, Macromolecules, 14, (1981), pp. 135–138, discloses the treatment of swollen poly(styrene-divinylbenzene) with n-butyllithium to form an intermediate in the preparation and halogenation of silylated polystyrene. Bates et al., Macromolecules, 14, (1981), pp. 881–883 discloses the treatment of a divinylbenzene gel with n-butyllithium to detect the presence of vinyl groups in the gel.

However, none of the above references teaches purifying fluids of acidic and oxidant impurities by contacting the fluids with a scavenger containing the pendant functional group disclosed herein and having a macroreticulate structure which provides internal reactive sites. Furthermore, none of these references teaches purifying fluids by contacting with a macroreticulate polymer scavenger having a sufficiently large surface area to effectively purify liquids which do not swell the polymer, and gases.

SUMMARY OF THE INVENTION

All of the desired properties for a scavenger, discussed above, are found in the novel class of polymer scavengers of this invention. This invention relates to novel macroreticulate polymer scavengers, useful for removing Lewis acid and oxidant impurities, comprising a macroreticulate polymer backbone having a plurality of pendant functional groups or mixtures of functional groups where the functional groups correspond to the general formula:

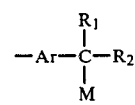

where Ar is an aromatic hydrocarbon radical containing from one to three rings, $R_1$ and $R_2$ are the same or different and are selected from the group consisting of hydrogen, alkyl hydrocarbon radicals containing from 1 to 12 carbon atoms, methylene-bridged benzophenone radicals, alkali or alkaline earth metal salts of methylene-bridged benzophenone, methylene-bridged fluorenone radicals and alkali or alkaline earth metal salts of methylene-bridged fluorenone; and M is selected from the group consisting of lithium, potassium, sodium, alkyl magnesium, and alkyl zinc, where the alkyl groups are alkyl hydrocarbon radicals containing from 1 to 12 carbon atoms. Impurities are readily removed from impure fluids by contacting the fluid with the macroreticulate polymer scavenger of this invention and then separating the fluid from the thus contacted scavenger.

While the macroreticulate polymer scavengers described above are suitable for most uses, it may be desirable for certain highly specialized applications to produce macroreticulate polymer scavengers which are capable of yielding ultra high purity gas streams. To obtain such products, the macroreticulate polymer scavenger of this invention is subjected to a thermal ageing process or to extraction with a hot inert solvent.

DETAILED DESCRIPTION OF THE PREFERRED EMBODIMENT

The polymers, useful as scavengers in accordance with this invention, have a high impurity absorbance capacity and comprise a macroreticulate polymeric backbone having a plurality of pendant metallated functional groups or mixture of functional groups corresponding to the general formula:

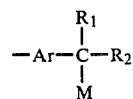

Ar is any aromatic hydrocarbon radical containing from one to three rings, such as phenylene, naphthylene, anthracene, fluorenylene and the like. Phenylene is preferred.

$R_1$ and $R_2$ are the same or different and can be hydrogen or an alkyl hydrocarbon radical containing from 1 to 12 carbon atoms. Typical alkyl hydrocarbon radicals include methyl, ethyl, and the various isomers of propyl, butyl, pentyl, hexyl, octyl, decyl and dodecyl. The preferred alkyl hydrocarbon radicals are pentyl radicals. Alternatively, $R_1$ or $R_2$ can be either a methylene-bridged radical of benzophenone, one of its alkali or alkaline earth metal salts, a methylene-bridged radical of fluorenone or one of its alkali or alkaline earth metal salts.

M is a metal or organometal chosen from the group consisting of lithium, sodium, potassium, alkyl magnesium or alkyl zinc, where the alkyl group is an alkyl hydrocarbon radical containing from about 1 to 12 carbon atoms. The nature of the metal-functional group bond varies depending on the choice of M. Where M is potassium, the bond is highly ionic, whereas where M is an alkyl zinc the bond is much more covalent. The other possible M's fall somewhere between these two extremes. The greater the ionic nature of the bond, the greater the carbanion character of the functionality. It has been found that the greater the carbanion character, the more reactive the functionality and the more intense the color of the scavenger. Only where M is alkyl zinc is the scavenger not intensely colored.

The polymeric backbone of the scavenger may be any polymer which is both macroreticulate and is not degraded by the metallating agent or by the processing conditions. The backbone polymer must be macroreticulate, i.e., it must possess a porous reticulate structure even in nonswelling fluids. Generally the pore size will be in the range of 1-1000 nanometers. A pore size of 5-10 nanometers is preferred. Because the backbone is macroreticulate, the surface area of the scavenger of this invention is sufficiently large so that the scavenger is effective not only when swollen by the fluid to be purified, but also when used to purify liquids that do not swell the scavenger and gases. The polymeric backbone must not react with the metallated functional groups since a functional group that reacts with the backbone is not available to scavenge impurities.

In some embodiments it is the most reactive and most intensely colored macroreticulate polymer scavenger that will be desired. There are other embodiments, however, where less reactivity is sought and in these situations less reactive pendant metallated functional groups or mixtures of metallated functional groups will be employed. The particular metallated functional group or mixture of metallated functional groups best suited for a specific application will be readily ascertained by one skilled in the art.

The macroreticulate polymer scavengers of this invention are stable at temperatures as high as 72° C. for prolonged periods of time and stable at temperatures as high as 135° C. for short periods of time.

The macroreticulate polymer scavengers of this invention are preferably synthesized by metallating macroreticulate polymers having pendant aromatic vinyl groups or pendant aromatic groups having ionizable protons at the alpha carbon atom. Exemplary of the macroreticulate polymers which can be metallated to form the scavengers of this invention are copolymers of styrene, vinyltoluene, vinylisopropylbenzene, vinylnaphthalene, alpha-methylstyrene and beta-methylstyrene or mixtures of such monomers, with one or more cross-linking agents such as divinylbenzene or divinylnaphthalene. The preferred macroreticulate polymer is commercially available macroreticulate poly(styrene-divinylbenzene), hereinafter referred to as PSDVB. This material has the requisite pendant groups.

The macroreticulate polymer backbone is metallated with an organometallic compound such as an alkyl lithium, alkyl sodium, alkyl potassium, dialkyl magnesium, alkyl magnesium halide or dialkyl zinc, where the alkyl group is an alkyl hydrocarbon radical containing from about 1 to 12 carbon atoms; or with a salt of a benzophenone radical-anion or dianion or a salt of a fluorenone radical-anion or dianion. The preferred organometallic compounds are tert-butyllithium, dibutylmagnesium and sodium/potassium salts of the benzophenone radical-anion or dianion.

Metallation reactions are well known in the art. The metallation can be achieved simply by contacting the macroreticulate polymer backbone with a solution containing the organometallic compound. Typical solvents for the organometallic compound include aliphatic hydrocarbons, aromatic hydrocarbons and ethers. The metallation is carried out at ambient temperature and pressure. The contact time is typically in the range of from about 10 minutes to about 10 hours. Other methods of synthesis of the macroreticulate polymer scavengers of this invention will be known to those skilled in the art.

The loading of the polymer backbone of the scavenger is an indication of the number of functional groups present and is expressed in milliequivalents of functional groups per milliliter of scavenger. The greater the loading, the greater the capacity of the macroreticulate polymer scavenger. The optimal loading for a particular scavenger will depend on the polymer backbone, the metallated functional group, the impurities to be removed and the particular application. The proper loading for a particular scavenger will be readily ascertained by one skilled in the art. In general, the loading will be from about 0.01 to about 3.0 milliequivalents, preferably from about 0.05 to about 2.5 milliequivalents, of functional groups per milliliter of scavenger.

Macroreticulate polymer scavengers with impurity absorbance capacities of from about 8 to about 12 liters of oxygen per liter of resin bed, much higher than the capacity of presently available fluid purifiers, can be prepared by the process of this invention. Such increased capacity reduces the frequency with which purification columns must be recharged during use. The increased capacity is believed to be due to the presence of excess organometallic metallating agent within the macroreticulate polymer matrix of the scavenger. The excess reagent is believed to be strongly bound in clusters to the metal immobilized in the functional groups on the polymeric backbone. As much as 70% of the capacity of the scavenger could be present as excess metallating agent.

The macroreticulate polymer scavenger of this invention is used to purify any material which is a gas or liquid when contacted with the scavenger and which is inert to the scavenger's metallated functionalities. Representative of the fluids which may be treated are saturated aliphatic hydrocarbons, including methane, ethane, propane, butane, pentane, hexane, heptane, octane, decane, dodecane and the like; olefins including ethylene, propylene, 1-butene and the like, (but not those olefins which would react with the metallated functionalities of the scavenger such as, those having an adjacent aromatic group including styrene, those having a conjugated double bond, including 1,3-butadiene and those containing acidic protons including allene and cyclopentadiene); and gases inert to the macroreticulate polymer scavenger including nitrogen, argon, helium, xenon, hydrogen, carbon tetrafluoride, ammonia and silane.

The macroreticulate polymer scavengers of this invention effectively remove a wide variety of impurities such as oxidants and Lewis acids. A Lewis acid is a compound which can accept a pair of electrons. Representative impurities include oxygen, water, alcohols, phenols, aldehydes, ketones, carboxylic acids, carbon dioxide, carbon monoxide, alpha-acetylenes, allene, conjugated dienes, peroxides, sulfur compounds and the like. The metallated functional group of the scavenger is believed to be capable of removing impurities by at least three mechanisms: oxidation, deprotonation and metallation.

The macroreticulate polymer scavenger can be contained in any device comprising a chamber which is impermeable to the fluid to be purified and has an inlet port and an outlet port to allow the impure fluid to enter mid-chamber and the purified fluid to exit. Preferably, the device is translucent so that any loss of color of the scavenger can be observed. Such devices are known in the art. Typical devices include beds and columns. The precise configuration of a device will depend upon the scavenger, the fluid and the impurities to be removed. The optimal size and configuration for a particular use will be readily determinable by one skilled in the art. In some embodiments it will be desirable to initially pack the device with unmetallated macroreticulate polymer and then carry out the above described metallation reaction using the device as the reaction vessel, thus forming the scavenger in situ. Because the macroreticulate polymer scavengers are largely insensitive to swelling in the inert fluids, columns can be packed to full volume without concern for large volume changes.

The impurities are removed in accordance with the process of this invention by passing the fluid containing impurities over the macroreticulate polymer scavenger, for example, by passing the impure fluid through a bed or column containing the scavenger. The time required will depend on the scavenger, the fluid and the composition and concentration of the impurities. The time required for a particular situation will be readily ascertained by one skilled in the art.

To determine if the proper conditions have been chosen for a particular situation, one need only to take an aliquot of the fluid after it has been passed through the macroreticulate polymer scavenger and test for the presence of impurities using any appropriate analytical method. A particularly useful method is simply to pass the fluid though an indicator solution after the fluid has been passed through the scavenger.

There is an additional benefit in using a macroreticulate polymer scavenger in which the metal-functional group bond has ionic character. Such scavengers are intensely colored. As the metallated functional group reacts with impurities, the metal-functional group bond is destroyed and consequently the scavenger loses its intense color. When the color is gone, the scavenging power has been depleted, so that the absence of color serves as an indication that the scavenger needs to be replaced.

Macroreticulate polymer scavengers with a metal-functional group bond having sufficient ionic character may also be used as an indicator for the various Lewis acid and oxidant impurities with which they react. A color change indicates that these impurities are present, whereas when there is no change in color, the fluid is free from the impurities.

Small amounts of low molecular weight hydrocarbons have occasionally been found in the off gas of the macroreticulate polymer scavengers of this invention. The source of the low molecular weight hydrocarbons is believed to be an excess of the organometallic compound used as the metallating agent, which, as mentioned previously, is believed to be bound in clusters to the metal immobilized in the functional groups on the polymeric backbone.

For most end uses the hydrocarbon emissions from the macroreticulate polymer scavengers are not a problem. However, as indicated above, it may be desirable for certain highly specialized applications, e.g., in the production of ultra high purity gas streams, to avoid introduction of new impurities into the fluid stream after oxidants and/or Lewis acids have been removed.

However, the excess metallating agent cannot be removed by simply washing with an appropriate solvent, nor can the excess be controlled by simple reduction in the amount of reagent added. The hydrocarbon emissions can be reduced to an acceptable level, e.g., to <0.5 ppm, either by subjecting the macroreticulate polymer scavenger to a thermal ageing process or by extracting the scavenger with a hot inert solvent.

The thermal ageing process involves heating the macroreticulate polymer scavenger at a high temperature, preferably from about 140° to about 250° C., for several hours, preferably more than six hours, in order to decompose the excess metallating agent. The thermal ageing is carried out in such a manner that the gaseous reaction products can be removed either under vacuum or under an inert gas purge to prevent undesirable side reactions.

The high impurity absorbance capacity of the macroreticulate polymer scavenger is not reduced by the ageing process. The excess metallating agent present within the macroreticulate polymer matrix of the scavenger is believed to disproportionate to produce metal hydride, which is also an active scavenger, and olefins. The aged scavenger therefore contains finely divided metal hydride dispersed within the pores of the macroreticulate polymer. As much as 70% of the capacity of the scavenger may be present as the dispersed metal hydride. This type of scavenger cannot be formed by simply mixing metal hydride with the metallated macroreticulate polymer, since the polymer particles would be coated with metal hydride. Commercially available metal hydride also has a lower surface area than the hydride produced by disproportionation of excess metallating agent as in the present invention. Simply mixing commercially available metal hydride with macroreticulate polymer scavenger would therefore result in lowered scavenging efficiency and entrainment of metal salts in the fluid stream to be purified.

The extraction process involves treating the macroreticulate polymer scavenger with a hot inert solvent having a low affinity for the scavenger. The extraction is carried out at a temperature of about 50° to about 120° C. for an extended period of time, e.g., at least 15 hours. Preferred solvents include aliphatic or cycloaliphatic hydrocarbons having a boiling point of about 35° to about 100° C., e.g., pentane, hexane, heptane, cyclopentane and cyclohexane. Hexane is the most preferred solvent. The extracted macroreticulate polymer scavenger has a somewhat lower impurity absorbance capacity than the aged scavenger.

After thermal ageing or extraction the macroreticulate polymer scavenger can be used in specialized applications that are hydrocarbon-sensitive such as production of ultra high purity gas streams for polysilicon formation, blanketing single crystal ingots, gas chromatographic guard columns, and semiconductor wafer manufacture.

EXAMPLE 1

Lithiated poly(styrene-divinylbenzene) scavenger is prepared in the following manner. A macroreticulate PSDVB polymer having a melting point of about 250° C., such as Amberlite XAD4 manufactured by Rohm & Haas, is washed with three bed volumes of water, then methanol, then isopropanol and finally hexane. One bed volume is equal to the volume of the unfilled bed. The polymer is placed in a reaction vessel and dried for about two hours under a stream of nitrogen at 120° C. The reaction vessel is then flooded with 2 molar tert-butyllithium. The mixture is agitated occasionaly for two hours. The resulting scavenger is washed with hexane and dried with nitrogen at room temperature. The product is a lithiated macroreticulate polymer scavenger of this invention which is dark red and turns white upon reaction with impurities.

EXAMPLE 2

Butylmagnesium poly(styrene-divinylbenzene) scavenger is prepared in the following manner. The procedure of Example 1 is followed except that the clean PSDVB polymer is flooded with 0.7 M dibutylmagnesium and reacted at room temperature for one hour. The resulting product is a macroreticulate polymer scavenger of this invention which is yellow and turns white upon reaction with impurities.

EXAMPLE 3

Potassium benzophenone poly(styrene-divinylbenzene) scavenger is prepared in the following manner. Sixty ml of PSDVB polymer are placed in one side of a vessel having two 250 ml round-bottom flasks joined by a coarse frit. Benzophenone (4.2 g) in 75 ml tetrahydrofuran is added to the other side. Sodium/potassium alloy is then added to the benzophenone solution and the solution immediately turns blue, the first of two color changes that occur during the reaction. When the solution becomes purple, the thus formed potassium benzophenone dianion solution is transferred to the side containing the solid polymer. The solution is then returned to the sodium/potassium alloy side and an additional 75 ml of tetrahydrofuran is added. After one-half hour the solution is returned to the side containing polymer and left overnight at room temperature. The resulting product is washed with 400 ml tetrahydrofuran, then 300 ml hexane and finally dried under nitrogen. The product is a macroreticulate polymer scavenger of this invention which is black to reflected light, is blue-purple when crushed under an inert atmosphere and turns white upon reaction with impurities.

EXAMPLE 4

This example illustrates the use of a lithiated poly(styrene-divinylbenzene) scavenger of this invention to purify propylene monomer.

A teflon-covered magnetic stir bar and 400 ml of purified hexane diluent are placed in a crown capped vessel. The diluent is then sparged with purified nitrogen for about 50 minutes. The vessel is placed in a constant temperature bath at 50° C. The vessel is then attached to a propylene manifold and flushed with propylene for several minutes in order to remove the nitrogen.

To the hexane diluent is added 1.2 ml of a 1.36 M diethylaluminum chloride in hexane and then 0.3 mmoles of $TiCL_3$. The propylene is polymerized at a temperature of 65° C. under 30 psig propylene pressure for 2.5 hours.

The polymerization is repeated following the same procedure except the propylene gas is first purified by passing it through a 400 ml column packed with lithiated poly(styrene-divinylbenzene) scavenger prepared as outlined in Example 1.

Without purification, the yield of insoluble polymer is 4.0 g and the percent insoluble yield is 97%. With purification, the yield of insoluble polymer is 5.0 g and the percent insoluble yield is 98%.

EXAMPLE 5

This example illustrates the efficacy of the marcoreticulate polymer scavengers of this invention in removing oxidants and Lewis acids from an inert gas stream.

The lithiated poly(styrene-divinylbenzene) scavenger prepared as in Example 1 is used to fill a 500 ml glass column. Nitrogen containing the impurities listed below is passed through the bed at a flow rate of 40 volumes of gas per volume of bed per hour. In order to determine if any impurities remain in the nitrogen after it is passed through the bed, the nitrogen is subsequently passed through an indicator solution. The indicator solution consists of 5 ml of diglyme which contains 2.5 micromoles of sodium anthracene. The anthracene will decolorize if any impurities are left in the nitrogen. No decolorization is detected. It is found that the lithiated macroreticulate polymer scavenger removes oxygen (41 micromoles), isopropanol (50 micromoles), carbon dioxide (41 micromoles), and acetone (54 micromoles) from the nitrogen stream.

A 30 ml serum vial containing about 3 ml of the lithiated macroreticulate polymer scavenger is pressurized to 10 psig with nitrogen. One ml of carbon monoxide is added. After three minutes there is no detectable carbon monoxide present in the nitrogen gas.

EXAMPLE 6

This example describes the thermal ageing process for reducing hydrocarbon emissions from lithiated PSDVB scavenger of this invention.

The macroreticulate PSDVB polymer scavenger is washed and dried as in Example 1. The reaction vessel is then flooded with 1.6 M n-butyllithium and the solvent is removed under a nitrogen stream at 65° C. The polymer is washed quickly with 2–4 bed volumes of hexane to remove surface alkyl lithium and dried at 120° for 16 hours. Total hydrocarbon emissions ($C_4$ hydrocarbons plus solvent) from the control are 0.4 ppm. The measurements are made with a gas chromatograph. The macroreticulate polymer scavenger is then aged by heating under a stream of nitrogen at 210° C. (wall temperature of reactor) for 12 hours. Total hydrocarbon emissions after thermal ageing are <0.02 ppm.

EXAMPLE 7

This example describes the extraction process for reducing hydrocarbon emissions from lithiated PSDVB scavenger of this invention.

The macroreticulate PSDVB polymer scavenger is washed and dried as in Example 1. The dried scavenger is then flooded with 2.0 M t-butyllithium. The reaction mixture is blown dry overnight using a stream of nitrogen at room temperature. Total hydrocarbon emissions from the control as measured with a gas chromatograph are 4.0 ppm. The macroreticulate polymer scavenger is then extracted with hot hexane at 57°–77° C. for 17 hours. Total hydrocarbon emissions after extraction are <0.1 ppm.

What I claim and desire to protect by Letters Patent is:

1. A macroreticulate polymer, useful as a scavenger for Lewis acid and oxidant impurities, comprising a macroreticulate polymer backbone having a plurality of pendant functional groups or mixtures of functional groups where the functional groups correspond to the general formula:

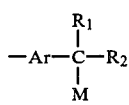

where Ar is an aromatic hydrocarbon radical containing from one to three rings; $R_1$ and $R_2$ are the same or different and are selected from the group consisting of hydrogen, alkyl hydrocarbon radicals containing from 1 to 12 carbon atoms, methylene-bridged benzophenone radicals, alkali or alkaline earth metal salts of methylene-bridged benzophenone; methylene-bridged fluorenone radicals and alkali or alkaline earth metal salts of methylene-bridged fluorenone; and M is selected from the group consisting of lithium, potassium, sodium, alkyl magnesium, and alkyl zinc where the alkyl groups are hydrocarbon alkyl radicals containing from 1 to 12 carbon atoms, said macroreticulate polymer having within its pores a metallating agent selected from the group consisting of alkyl lithium, alkyl sodium, alkyl potassium, dialkyl magnesium, alkyl magnesium halide and dialkyl zinc, where the alkyl group is an alkyl hydrocarbon radical containing from 1 to 12 carbon atoms; alkali or alkaline earth metal salts of benzophenone and alkali or alkaline earth metal salts of fluorenone, and having an impurity absorption capacity, measured as oxygen, of greater than about eight liters of oxygen per liter of polymer bed.

2. The macroreticulate polymer of claim 1 wherein M is lithium, $R_1$ is hydrogen and $R_2$ is a pentyl radical.

3. The macroreticulate polymer of claim 1 wherein M is butylmagnesium, $R_1$ is hydrogen and $R_2$ is a pentyl radical.

4. The process for making a macroreticulate polymer scavenger comprising a macroreticulate polymer backbone having a plurality of pendant functional groups, said macroreticulate polymer scavenger having within its pores a metallating agent selected from the group consisting of alkyl lithium, alkyl sodium, alkyl potassium, dialkyl magnesium, alkyl magnesium halide and dialkyl zinc, where the alkyl group is an alkyl hydrocarbon radical containing from 1 to 12 carbon atoms; alkali or alkaline earth metal salts of benzophenone and alkali or alkaline earth metal salts of fluorenone, and having an impurity absorption capacity, measured as oxygen, of greater than about eight liters of oxygen per liter of polymer bed, wherein said process comprises contacting a macroreticulate polymer having pendant aromatic vinyl groups or pendant aromatic groups having ionizable protons at the alpha carbon atom with a stoichiometric excess of said metallating agent.

5. The process of claim 4 wherein the macroreticulate polymer backbone is macroreticulate poly(styrene-divinylbenzene).

6. The process of claim 5 wherein the metallating agent is tert-butyllithium.

7. The process of claim 5 wherein the metallating agent is dibutylmagnesium.

8. The process of claim 5 wherein the metallating agent is an alkali salt of benzophenone.

9. The process of claim 4 wherein the macroreticulate polymer scavenger containing pendant functional groups is subsequently purified by heating to a temperature of from about 140° to about 250°C. for more than six hours.

10. A macroreticulate polymer scavenger containing a plurality of pendant functional groups prepared by the process of claim 4 and subsequently heated to a temperature of from about 140° to about 250° C. for more than six hours.

11. The macroreticulate polymer scavenger of claim 10 having metal hydride within its pores, the metal of the hydride being the same as the metal of the pendant functional groups.

12. The macroreticulate polymer scavenger of claim 11 wherein the metal is lithium.

* * * * *